(12) United States Patent
Amanullah

(10) Patent No.: US 10,487,253 B2
(45) Date of Patent: *Nov. 26, 2019

(54) DATE TREE SPIKELET-BASED ADDITIVE FOR MECHANICAL REINFORCEMENT OF WEAK AND UNSTABLE LOST CIRCULATION MATERIAL (LCM) SEALS/PLUGS

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,374

(22) Filed: Nov. 8, 2016

(65) Prior Publication Data

US 2018/0127632 A1    May 10, 2018

(51) Int. Cl.
*C09K 8/035*    (2006.01)
*C09K 8/506*    (2006.01)
*C09K 8/514*    (2006.01)

(52) U.S. Cl.
CPC ............. *C09K 8/035* (2013.01); *C09K 8/506* (2013.01); *C09K 8/514* (2013.01); *C09K 2208/04* (2013.01); *C09K 2208/08* (2013.01)

(58) Field of Classification Search
None
See application file for complete search history.

(56) References Cited

U.S. PATENT DOCUMENTS

| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |

(Continued)

FOREIGN PATENT DOCUMENTS

| CN | 101311243 A | 11/2008 |
| CN | 101560084 A | 10/2009 |

(Continued)

OTHER PUBLICATIONS

International Search Report and Written Opinion for International Application No. PCT/US2017/053355; International filing date Sep. 26, 2017; Report dated Jan. 17, 2018 (pp. 1-14).

(Continued)

*Primary Examiner* — John J Figueroa
(74) *Attorney, Agent, or Firm* — Bracewell LLP; Constance G. Rhebergen; Brian H. Tompkins

(57) ABSTRACT

A lost circulation material (LCM) having chips formed from date tree spikelets of a date tree is provided. The date tree spikelets may be obtained from the waste product of date tree and date fruit processing. The date tree spikelet-based LCM may be added to a drilling fluid (for example, a drilling mud) to mitigate or prevent such lost circulation in a well. The date tree spikelet-based LCM may be added to one or more additional LCMs as an LCM additive for addition to a drilling fluid (for example, a drilling mud) to mitigate or prevent such lost circulation in a well. Methods of lost circulation control with the date tree spikelet-based LCM are also provided.

20 Claims, 8 Drawing Sheets

(56) References Cited

U.S. PATENT DOCUMENTS

| | | | |
|---|---|---|---|
| 2,789,948 | A | 4/1957 | Tronolone |
| 2,811,488 | A | 10/1957 | Nestle et al. |
| 2,912,380 | A | 11/1959 | Deane Groves |
| 2,943,679 | A | 7/1960 | Scott, Jr. |
| 2,943,680 | A | 7/1960 | Scott et al. |
| 3,147,127 | A | 9/1964 | Shannon |
| 4,086,098 | A | 4/1978 | Le Ruyet et al. |
| 4,110,225 | A | 8/1978 | Cagle |
| 4,127,548 | A | 11/1978 | Alexander |
| 4,275,788 | A | 6/1981 | Sweatman |
| 4,619,772 | A | 10/1986 | Black et al. |
| 5,004,553 | A | 4/1991 | House et al. |
| 5,118,664 | A | 6/1992 | Burts, Jr. |
| 5,197,324 | A | 3/1993 | Keys |
| 5,332,724 | A | 7/1994 | Burts, Jr. |
| 5,484,028 | A | 1/1996 | Rose |
| 5,501,275 | A | 3/1996 | Card et al. |
| 5,801,127 | A | 9/1998 | Duhon, Sr. |
| 6,016,879 | A * | 1/2000 | Burts, Jr. ............. C09K 8/035 166/295 |
| 6,098,712 | A | 8/2000 | Burts, Jr. |
| 6,102,121 | A | 8/2000 | Burts, Jr. |
| 6,271,001 | B1 | 8/2001 | Clarke et al. |
| 6,350,594 | B1 | 2/2002 | Clarke et al. |
| 6,518,224 | B2 | 2/2003 | Wood |
| 6,716,798 | B1 | 4/2004 | Burts, Jr. |
| 6,750,179 | B1 | 6/2004 | Burts, Jr. |
| 6,790,812 | B2 | 9/2004 | Halliday |
| 6,806,232 | B1 | 10/2004 | Cart |
| 6,814,798 | B2 | 11/2004 | Vijn et al. |
| 6,861,392 | B2 | 3/2005 | Shaarpour |
| 6,932,158 | B2 | 8/2005 | Burts |
| 7,226,895 | B2 | 6/2007 | Xiang |
| 7,271,131 | B2 | 9/2007 | Halliday et al. |
| 7,284,611 | B2 | 10/2007 | Reddy et al. |
| 7,297,662 | B2 | 11/2007 | Verret |
| 7,297,663 | B1 | 11/2007 | Kilchrist et al. |
| 7,332,026 | B2 | 2/2008 | Fyten et al. |
| 7,488,705 | B2 | 2/2009 | Reddy et al. |
| 7,507,692 | B2 | 3/2009 | Xiang |
| 7,537,054 | B2 | 5/2009 | Reddy et al. |
| 7,629,297 | B2 | 12/2009 | Shaarpour |
| 7,744,689 | B2 | 6/2010 | Hojaji et al. |
| 7,902,126 | B1 | 3/2011 | Burts, Jr. |
| 7,923,413 | B2 | 4/2011 | Ghassemzadeh |
| 7,964,537 | B2 | 6/2011 | Rayborn, Sr. et al. |
| 8,371,381 | B2 | 2/2013 | Shindgikar et al. |
| 8,383,558 | B2 | 2/2013 | Reddy et al. |
| 8,404,622 | B2 | 3/2013 | Ghassemzadeh |
| 8,673,825 | B2 | 3/2014 | Rayborn, Sr. et al. |
| 8,739,872 | B1 | 6/2014 | Miller et al. |
| 8,776,882 | B2 | 7/2014 | Shindgikar et al. |
| 8,887,808 | B2 | 11/2014 | Kumar et al. |
| 8,935,957 | B2 | 1/2015 | Kulkarni et al. |
| 8,992,670 | B1 | 3/2015 | Vohra |
| 9,140,118 | B2 | 9/2015 | Kulkarni et al. |
| 9,175,529 | B2 | 11/2015 | Jamison et al. |
| 9,376,607 | B2 | 6/2016 | James |
| 9,410,066 | B2 | 8/2016 | Ghassemzadeh |
| 9,416,306 | B2 | 8/2016 | Savari et al. |
| 9,453,156 | B2 | 9/2016 | Wu |
| 9,505,659 | B2 | 11/2016 | Bickbau |
| 9,592,488 | B2 | 3/2017 | Yusuf et al. |
| 9,623,067 | B1 | 4/2017 | Awad et al. |
| 9,688,901 | B2 | 6/2017 | Fontenot |
| 9,783,727 | B2 | 10/2017 | Lahman et al. |
| 2002/0010100 | A1 | 1/2002 | Wood |
| 2004/0023813 | A1 | 2/2004 | Burts, III |
| 2004/0129460 | A1 | 7/2004 | MacQuoid et al. |
| 2004/0244978 | A1 | 12/2004 | Shaarpour |
| 2005/0113260 | A1 | 5/2005 | Wood |
| 2005/0124502 | A1 | 6/2005 | Shaarpour |
| 2005/0217852 | A1 | 10/2005 | Bennett et al. |
| 2006/0106136 | A1 | 5/2006 | Abu-Sharkh |
| 2006/0122069 | A1 | 6/2006 | Burts, III |
| 2006/0157247 | A1 | 7/2006 | Burts, III |
| 2006/0160907 | A1 * | 7/2006 | Stamp ............. C05F 5/002 516/100 |
| 2009/0054269 | A1 | 2/2009 | Chatterji et al. |
| 2009/0286697 | A1 | 11/2009 | Shaarpour |
| 2009/0305038 | A1 | 12/2009 | Duran et al. |
| 2009/0305911 | A1 | 12/2009 | Pomerleau |
| 2010/0152070 | A1 | 6/2010 | Ghassemzadeh |
| 2010/0181110 | A1 | 7/2010 | Harr |
| 2010/0193244 | A1 | 8/2010 | Hoskins |
| 2010/0230164 | A1 | 9/2010 | Pomerleau |
| 2010/0230169 | A1 | 9/2010 | Pomerleau |
| 2011/0214870 | A1 | 9/2011 | Shaarpour |
| 2011/0278006 | A1 | 11/2011 | Sanders |
| 2012/0157354 | A1 | 6/2012 | Li et al. |
| 2012/0247763 | A1 | 10/2012 | Rakitsky et al. |
| 2013/0025863 | A1 | 1/2013 | Lin et al. |
| 2014/0038857 | A1 | 2/2014 | Miller et al. |
| 2014/0102987 | A1 | 4/2014 | Yusuf et al. |
| 2014/0110177 | A1 | 4/2014 | Harr |
| 2014/0135237 | A1 | 5/2014 | Villarreal, Jr. et al. |
| 2014/0209290 | A1 | 7/2014 | Jamison et al. |
| 2014/0231082 | A1 | 8/2014 | Jamison et al. |
| 2014/0262281 | A1 | 9/2014 | Kulkarni et al. |
| 2014/0318793 | A1 | 10/2014 | Van Petergem et al. |
| 2014/0353043 | A1 | 12/2014 | Amanullah et al. |
| 2015/0051120 | A1 | 2/2015 | Hurd et al. |
| 2015/0072901 | A1 | 3/2015 | Samuel et al. |
| 2015/0166875 | A1 | 6/2015 | Bird et al. |
| 2015/0247081 | A1 | 9/2015 | Dillon et al. |
| 2015/0251156 | A1 | 9/2015 | Yusuf et al. |
| 2016/0060985 | A1 | 3/2016 | Lin et al. |
| 2016/0096988 | A1 | 4/2016 | Lin et al. |
| 2016/0177164 | A1 | 6/2016 | Dillon et al. |
| 2016/0222274 | A1 | 8/2016 | Hoskins |
| 2016/0222275 | A1 | 8/2016 | Galindo et al. |
| 2016/0257869 | A1 | 9/2016 | Kulkarni et al. |
| 2016/0264839 | A1 | 9/2016 | Mata et al. |
| 2016/0289528 | A1 | 10/2016 | Wagle et al. |
| 2016/0312100 | A1 | 10/2016 | Amanullah et al. |
| 2017/0058180 | A1 | 3/2017 | Hossain et al. |
| 2017/0137688 | A1 | 5/2017 | Amanullah |
| 2017/0166795 | A1 | 6/2017 | Walker et al. |
| 2017/0298263 | A1 * | 10/2017 | Amanullah ............. C09K 8/035 |
| 2018/0002588 | A1 * | 1/2018 | Amanullah ............. C09K 8/035 |
| 2018/0002589 | A1 * | 1/2018 | Amanullah ............. C09K 8/035 |
| 2018/0016483 | A1 * | 1/2018 | Amanullah ............. C09K 8/035 |
| 2018/0057729 | A1 * | 3/2018 | Amanullah ............. C09K 8/035 |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | H0671171 A | 3/1994 |
| WO | WO2004013448 A2 | 2/2004 |
| WO | 2010019535 A2 | 2/2010 |
| WO | 2010088484 A2 | 8/2010 |
| WO | WO2010142370 A1 | 12/2010 |
| WO | 2012037600 A1 | 3/2012 |
| WO | 2012061187 A2 | 5/2012 |
| WO | 2013039938 A1 | 3/2013 |
| WO | WO2014008598 A1 | 1/2014 |
| WO | 2014197417 A1 | 12/2014 |
| WO | WO2015142156 A1 | 9/2015 |
| WO | 2015199652 A1 | 12/2015 |
| WO | WO2016019416 A1 | 2/2016 |
| WO | WO2016028470 A1 | 2/2016 |
| WO | 2016172287 A1 | 10/2016 |
| WO | 2017087434 A1 | 5/2017 |
| WO | WO2018005575 A1 | 1/2018 |

(56) References Cited

FOREIGN PATENT DOCUMENTS

OTHER PUBLICATIONS

International Search Report and Written Opinion for International Application No. PCT/US2017/060079; International Filing Date Nov. 6, 2017; Report dated Dec. 18, 2017 (pp. 1-14).
International Search Report and Written Opinion for International Application No. PCT/US2017/067179 International Filing date Dec. 19, 2017; Report dated Feb. 21, 2018; pp. 1-14.
Amanullah, et al.: "Application of an indigenous eco-friendly raw material as fluid loss additive", Journal of Petroleum Science and Engineering, vol. 139, (2016) pp. 191-197.
BakerHughes.com "SOLUFLAKE Flaked Calcium Carbonate" (XP055401101) Jan. 8, 2016 (1 Page).
International Search Report and Written Opinion for International Application No. PCT/US2017/039614; Report dated Sep. 11, 2017; pp. 1-12.
International Search Report and Written Opinion for International Application No. PCT/US2017/039616; Report dated Sep. 11, 2017; pp. 1-11.
Amanullah "Characteristics, behavior and performance of ARC Plug—A date seed-based sized particulate LCM." SPE Kingdom of Saudi Arabia Annual Technical Symposium and Exhibition. Society of Petroleum Engineers, 2016. (pp. 1-9).
International Search Report and Written Opinion for PCT/US2017/047877; Report dated Oct. 27, 2017; 15 pages.
Alsaba, M. et al. "Review of lost circulation materials and treatments with an updated classification." AADE National Technical Conference and Exhibition, Houston, TX, Apr. 2014. pp. 1-9.
International Search Report and Written Opinion for International Application No. PCT/US2016/062130; Report dated Jan. 27, 2017 (pp. 1-12).
International Search Report and Written Opinion for International Application No. PCT/US2017/027287; report dated Sep. 13, 2017; 11 pages.
International Search Report and Written Opinion for International Application No. PCT/US2017/041611; International Filing Date Jul. 12, 2017; Report dated Oct. 27, 2017 (pp. 1-15).
International Search Report and Written Opinion for International Application No. PCT/US2018/048423; International Filing Date Aug. 29, 2018; Report dated Nov. 29, 2018 (pp. 1-12).
Alawad, Musaed N.J., et al.; "Superior fracture-seal material using crushed date palm seeds for oil and gas well drilling operations" Journal of King Saud University—Engineering Sciences (2017); pp. 1-7.
Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.
Saudi Aramco "Local pal trees support technical solutions" Dhahran, Aug. 4, 2015; available as of Sep. 19, 2018 at the website: www.saudiaramco.com/en/home/news-media/news/local-palm-trees-support.html.
International Search Report and Written Opinion for International Application No. PCT/US2018/034291; International Filing Date May 24, 2018; Report dated Jul. 31, 2018 (pp. 1-11).
Wajheeuddin, M. et al. "An experimental study on particle sizing of natural substitutes for drilling fluid applications." Journal of Nature Science and Sustainable Technology 8.2 (2014): pp. 1-14.

\* cited by examiner

500

502

DATE TREE SPIKELET-BASED ADDITIVE FOR MECHANICAL REINFORCEMENT OF WEAK AND UNSTABLE LOST CIRCULATION MATERIAL (LCM) SEALS/PLUGS

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (or drilling mud) pumped into a well returns partially or does not return to the surface. While some fluid loss is expected, fluid loss excessive is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost and may be categorized as seepage type, moderate type, severe type, and total loss. Different types of lost circulation materials (LCMs), such as blends, pills and slurries, may be used to control loss of circulation. The LCMs may be used in an attempt to form a stable seal or plug at the opening or within the body of permeable formations, or fractured or vugular loss zones, to prevent mud losses during drilling and cement losses during cementing.

SUMMARY

The type of LCM used in a lost circulation situation depends on the extent of lost circulation and the type of formation. Different types of loss control materials (LCMs) such as granular, fibrous and flaky materials are frequently used either alone or in combination to control loss of circulation. Costs incurred in loss circulation situations may be due to losses of drilling fluids, losses of cement, losses of production or nonproductive time (NPT), LCM failure rate, and the costs of LCMs. The purchase and importation of LCMs to drilling locations may be expensive and time-consuming. Additionally, lost circulation can cause environmental problems if drilling fluids or LCMs interact with the environment surrounding the reservoir. The manufacture, use, and disposal of some conventional LCMs may pose a risk to sensitive environments, such as marine environments (e.g., offshore and deep water drilling environments) because they are not biodegradable and can be toxic to marine life.

Some gel-based LCMs, and other conventional LCM pills and slurries, may lack structural support and form weak and soft seals and plugs that are unable to tolerate higher load and overbalance pressures during drilling or cementing. The seals and plugs formed by such LCMs may have relatively low stiffness moduli and load bearing capacities and may be unable to prevent the loss of circulation during some operations. In some instances, additives and other materials may be added to such LCMs to provide structural support for seals and plugs and improve the stiffness moduli and load bearing capacity of the seals and plugs.

In one embodiment, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM). The LCM includes a plurality of chips formed from a plurality of date tree spikelets. In some embodiments, the LCM consists of the plurality of chips formed from the plurality of date tree spikelets. In some embodiments, the plurality of date tree spikelets includes a plurality of untreated date tree spikelets. In some embodiments, the LCM is a first LCM and the altered drilling fluid includes the drilling fluid, the first LCM, and a second LCM. In some embodiments, the first LCM and the second LCM have a weight ratio of 1:3. In some embodiments, each of the plurality of chips has a length in the range of 5 millimeters (mm) to 10 mm, each of the plurality of chips has an equivalent diameter in the range of 1 millimeters (mm) to 2 mm, and each of the plurality of chips has an aspect ratio in the range of 2.5 to 10.

In another embodiment, an altered drilling fluid is provided that includes a drilling fluid and a lost circulation material (LCM). The LCM includes a plurality of chips formed from a plurality of date tree spikelets. In some embodiments, the plurality of date tree spikelets includes a plurality of untreated date tree spikelets, such that the plurality of untreated date tree spikelets are not introduced to an alkali, an acid, a bleaching or an oxidation agent before forming the LCM. In some embodiments, the LCM consists of the plurality of chips formed from the plurality of date tree spikelets. In some embodiments, the LCM is a first LCM and the altered drilling fluid includes the drilling fluid, the first LCM, and a second LCM. In some embodiments, the first LCM and the second LCM have a weight ratio of 1:3. In some embodiments, each of the plurality of chips has a length in the range of 5 millimeters (mm) to 10 mm, each of the plurality of chips has an equivalent diameter in the range of 1 millimeters (mm) to 2 mm, and each of the plurality of chips has an aspect ratio in the range of 2.5 to 10.

In another embodiment, a method of forming a lost circulation material (LCM) includes separating a plurality of date tree spikelets from a plurality of date tree panicles and chopping the plurality of date tree spikelets to form a plurality of chips having a length in the range of 5 millimeters (mm) to 10 mm to form a lost circulation material (LCM) that includes the plurality of chips. In some embodiments, the method includes drying the plurality of chips for a time period after chopping the plurality of date tree spikelets, such that the drying reduces the moisture content of the plurality of chips to less than 6%. In some embodiments, each of the plurality of chips has an equivalent diameter in the range of 1 millimeters (mm) to 2 mm, and each of the plurality of chips has an aspect ratio in the range of 2.5 to 10. In some embodiments, the plurality of chips include a plurality of untreated chips that are not introduced to an alkali, an acid, a bleaching or an oxidation agent before forming the LCM.

In some embodiments, a lost circulation material (LCM) composition is provided. The LCM composition includes a first lost circulation material having a plurality of flakes, a plurality of fibers, or any combination thereof and a second lost circulation material having a plurality of chips formed from a plurality of processed date tree spikelets, the plurality of chips having a length in the range of 5 millimeters (mm) to 10 mm. In some embodiments, each of the plurality of chips has an equivalent diameter in the range of 1 millimeters (mm) to 2 mm, and each of the plurality of chips has an aspect ratio in the range of 2.5 to 10.

DETAILED DESCRIPTION

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date tree spikelet-based LCM that includes chips formed from date tree spikelets to mitigate or prevent lost circulation in a well, as well as provide seepage control and minimize or prevent fluid loss. As used in the disclosure, the term date tree spikelet refers to or includes the spikelet of a date tree. As used in the disclosure, the term chip refers to a small piece and does not refer to or require a particular shape or geometry. The date tree spikelet-based LCM includes chips to mitigate or prevent loss of circulation while drilling and cementing. In some embodiments, the date tree spikelet-based LCM may be an LCM additive and added to one or more additional LCMs. In such embodiments, the chips of the date tree spikelet-based LCM may provide skeletal support and structural integrity by reducing the open flow area of fractures and gaps and increasing the rigidity of plugs and seals formed by the one or more additional LCMs.

In some embodiments, the date tree spikelet-based LCM may include untreated chips formed from untreated date tree spikelets. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the LCM. In accordance with this definition, an LCM that is treated may behave in a manner different than its original starting material. In such embodiments, the chips of the date tree spikelet-based LCM may be manufactured without treating before, during, or after separation, cleaning, chopping, or any other processing.

Figure 1:
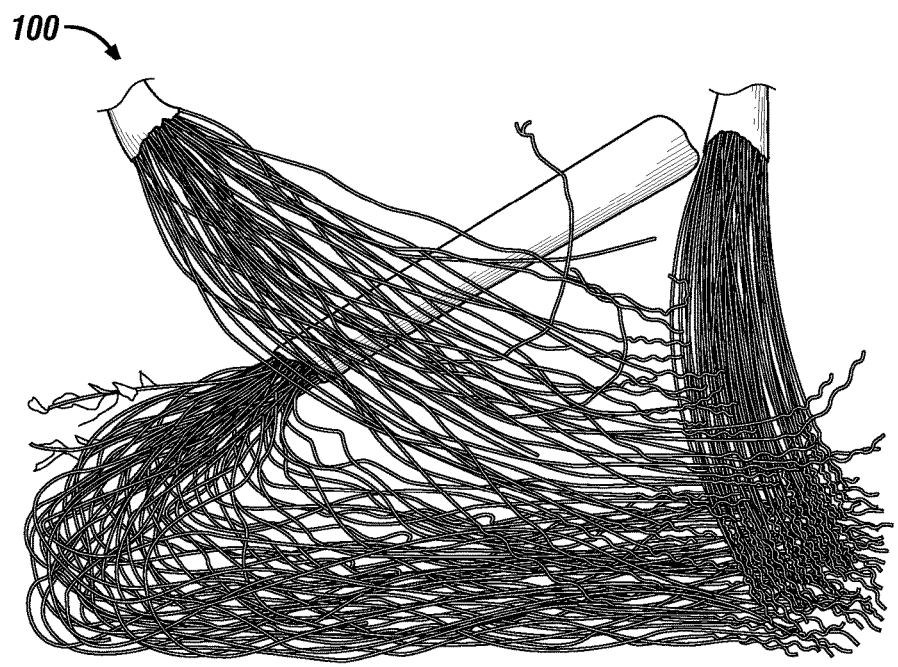
FIG. 1 is a photograph of date fruits with spikelets attached to panicles of a date tree in accordance with an embodiment of the disclosure.

FIG. 1 is a photograph 100 of date fruits with spikelets attached to panicles of a date tree. The spikelets are attached to the date fruits via date fruit caps that protect the date fruit and prevent its detachment until harvesting. The spikelets may be obtained from date trees (also referred to as "date palms") used for the production of date fruits (also referred to as "dates"). For example, the spikelets shown in FIG. 1 may be produced from the waste product of date tree and date fruit processing. Each fruit-bearing panicle obtained from a date tree may include hundreds of spikelets, resulting in a relatively large and sustainable source of spikelet for use in the date tree spikelet-based LCM described in the disclosure. In addition to the superior technical performance described in the disclosure, the eco-friendly, non-toxic, and environmentally friendly properties of the date tree spikelet-based LCM may have superior environmental performance as compared to conventional LCM additives. For example, the date tree spikelet-based LCM described in the disclosure may meet or exceed environment regulations for drilling and cementing operations.

Figure 2:
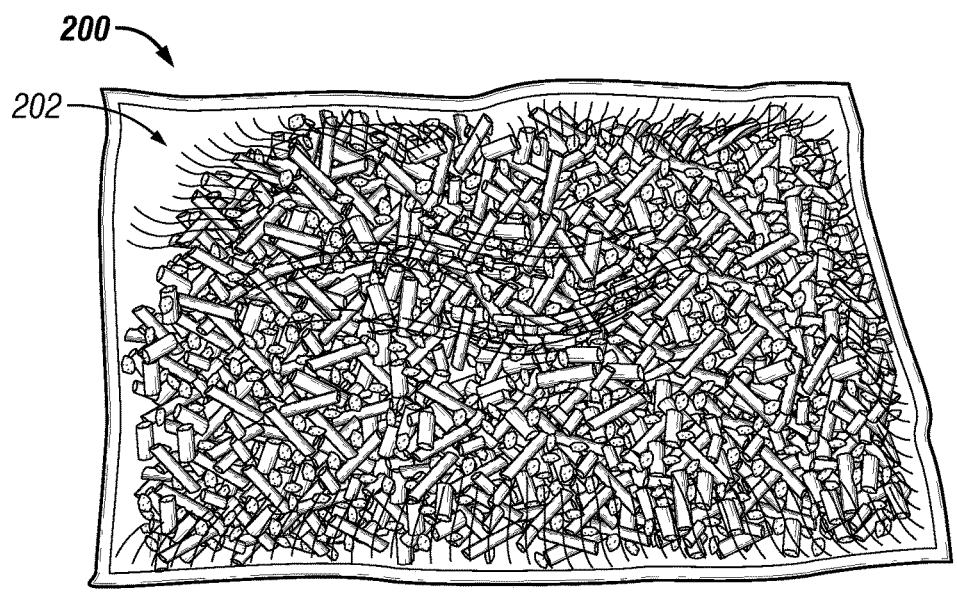
FIG. 2 is a photograph of chips formed from date tree spikelets in accordance with an embodiment of the disclosure.

FIG. 2 is a photograph 200 of chips 202 formed from date tree spikelets in accordance with an embodiment of the disclosure. In some embodiments, the date tree spikelet chips may have a generally cylindrical shape and a length in the range of about 5 millimeters (mm) to about 10 mm with an equivalent diameter in the range of about 1 mm to about 2 mm, and an aspect ratio range of about 2.5 to about 10. Thus, the date tree spikelet-based LCM chips described in the disclosure may reinforce and provide structural support to seals and plugs formed in moderate to severe loss zones having gaps and fractures of about 2 mm or greater. As described further herein, the chips 202 may improve the stiffness and load bearing quality of plugs and seals due to a scaffolding type structure support of the plugs and seals, thus preventing failure (e.g., collapse) of the seals and plugs under increased pressures and forces encountered during drilling and cementing operations. The chips 202 may be added to gel-based LCM, LCM slurries, LCM pills, LCM blends, and other suitable LCMs that may form soft and weak seals and plugs having low stiffness and load bearing capacities. The addition of the chips 202 may provide skeletal support and structural integrity by reducing the open flow area of fractures and gaps and increasing the rigidity of plugs and seals formed by such LCMs.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a date tree spikelet-based LCM were prepared and added to a commercially available LCM (in an LCM blend) as an LCM additive. The experimental results illustrate the improvement of the stiffness and load bearing capacity of the seals and plugs reinforced after addition of the date tree spikelet-based LCM to the commercially available LCM in an LCM blend.

The date tree spikelet-based LCM was tested using a commercially available proprietary fiber and flake LCM, SOLU-SEAL™ manufactured by Drilchem of Jakarta, Indonesia. An LCM slurry composition was formed from 350 cc of water, 2 grams of xanthan gum ("XC"), and 30 grams of SOLU-SEAL™. Five grams of the date tree-spikelet based LCM was added to the LCM slurry composition to form a first date tree spikelet-based LCM slurry composition having 350 cc of water, 2 grams of xanthan gum ("XC"), 30 grams of SOLU-SEAL™, and 5 grams of date tree-spikelet based LCM. Thus, the first date tree spikelet-based LCM slurry composition has date tree spikelet-based LCM to SOLU-SEAL™ weight ratio of 1:6. Ten grams of the date tree-spikelet based LCM was added to the LCM slurry composition to form a first date tree spikelet-based LCM slurry composition having 350 cc of water, 2 grams of xanthan gum ("XC"), 30 grams of SOLU-SEAL™, and 10 grams of date tree-spikelet based LCM. Thus, the first date tree spikelet-based LCM slurry composition has date tree spikelet-based LCM to SOLU-SEAL™ weight ratio of 1:3.

Figure 3:
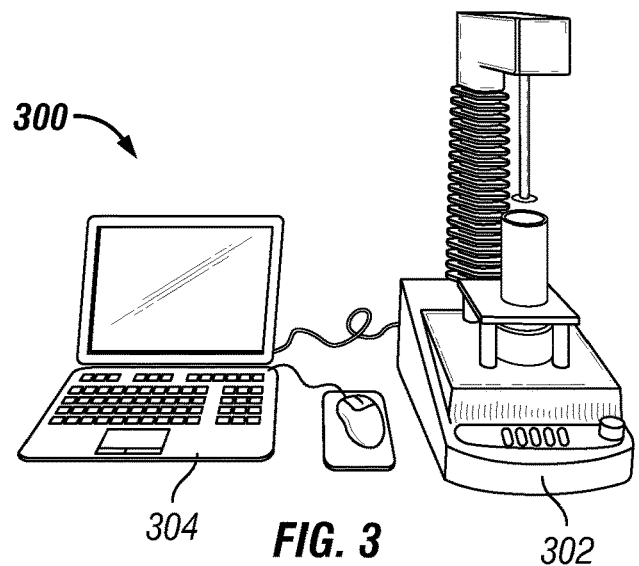
FIG. 3 is a photograph of a testing apparatus for the measurement of load capacity data in accordance with an embodiment of the disclosure.
Figure 4A:
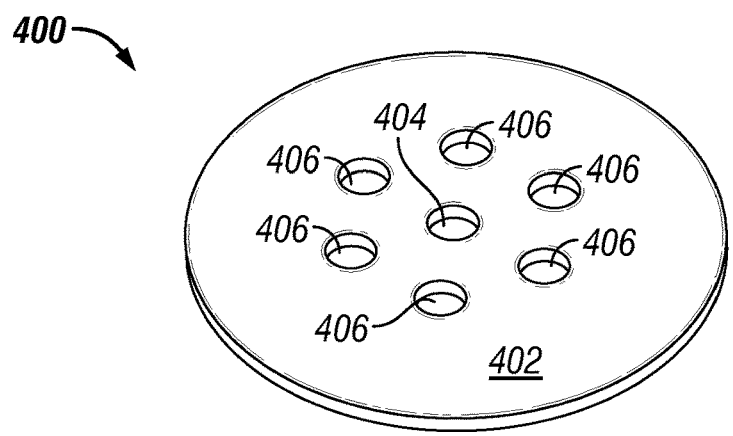
FIG. 4A is a photograph of a perforated disc used in the testing apparatus of FIG. 3 in accordance with an embodiment of the disclosure.
Figure 4B:
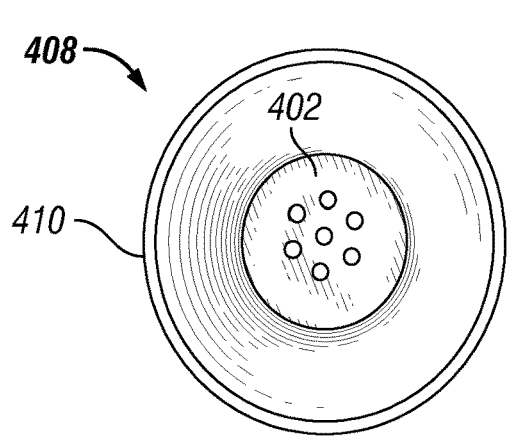
FIG. 4B is a photograph of a test cell and the perforated disc used in the testing apparatus of FIG. 3 in accordance with an embodiment of the disclosure.

The testing of the LCM slurry composition and the example date tree spikelet-based LCM slurry compositions was conducting using a commercial load frame with a load measuring capacity of up to 50 kilograms-force (kgf) and using a test cell and a perforated disc having 5 mm holes. FIG. 3 is a photograph 300 of a testing apparatus 302 coupled to a computer 304 for the measurement of load capacity data. FIG. 4A is a photograph 400 of a perforated disc 402 used in the testing apparatus 302 and having one central 5 mm hole 404 and six peripheral 5 mm holes 406 to simulate a severe loss zone, such as a vugular loss zone. FIG. 4B is a photograph 408 of the test cell 410 and shows the perforated disc 402 fitted to the test cell 410 for use in the testing apparatus 302.

The example date tree spikelet-based LCM was added to commercially available LCMs and tested using the testing apparatus 302 and the following load measurement test procedure:
1. Insert the perforated disc into the test cell;
2. Add a 175 cc LCM pill of the tested LCM slurry composition into the test cell;
3. Place the test cell into the placement platform of the load frame;
4. Conduct a compression test using a loading foot displacement rate of 1 mm/second to push the tested LCM pill downward towards the perforated disc.

Figure 5A:
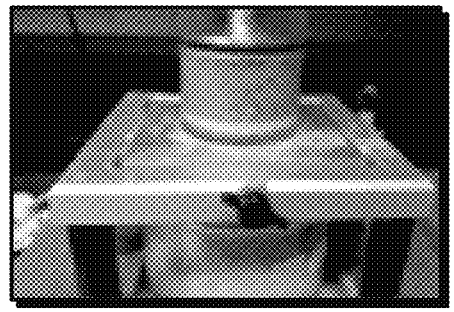
FIGS. 5A and 5B are photographs of plugs formed after a test procedure using date tree spikelet-based LCMs in accordance with an embodiment of the disclosure.
Figure 5B:
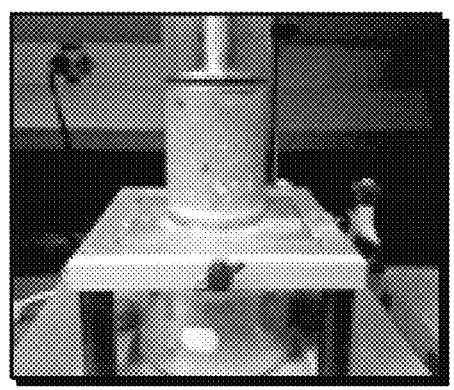
Figure 6A:
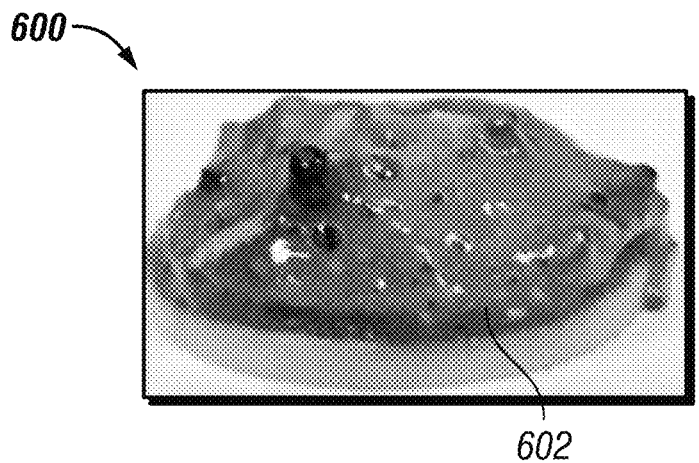
FIGS. 6A and 6B is a close-up photograph of plugs formed after a test procedure using date tree spikelet-based LCMs in accordance with an embodiment of the disclosure.
Figure 6B:
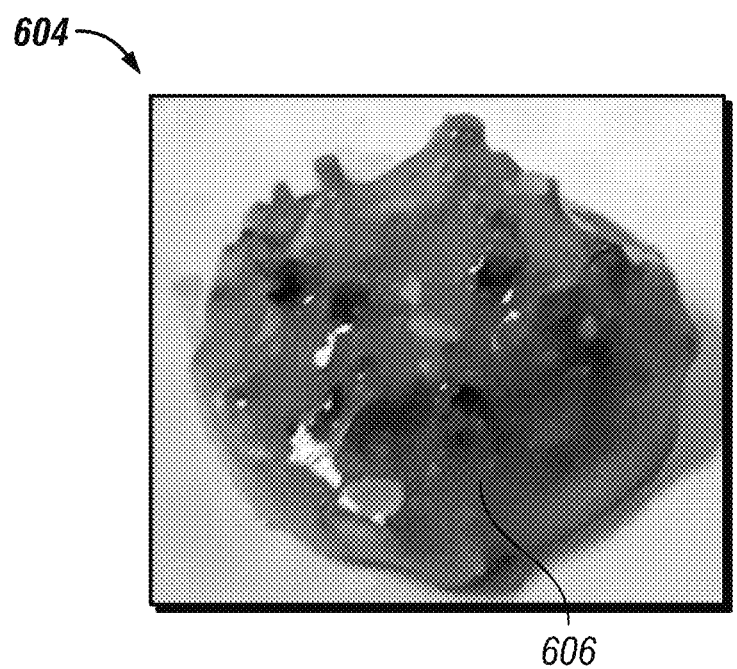

FIG. 5A is a photograph 500 of the plug formed after the test procedure by the first date tree spikelet-based LCM slurry composition having 5 grams of date tree spikelet-based LCM. FIG. 5B is a is a photograph 502 of the plug formed after the test procedure by the second date tree spikelet-based LCM slurry composition having 10 grams of date tree spikelet-based LCM. FIG. 6A is a close up photograph 600 of the plug 602 formed after the test procedure first date tree spikelet-based LCM slurry composition having 5 grams of date tree spikelet-based LCM. FIG. 6B is a close up photograph 604 of the plug 606 formed after the test procedure by the second date tree spikelet-based LCM slurry composition having 10 grams of date tree spikelet-based LCM. The plugs 602 and 606 show the structural support and reinforcing characteristics of the date tree spikelet-based LCM chips applied to the LCM slurry compositions formed using the commercially available LCM.

Figure 7A:
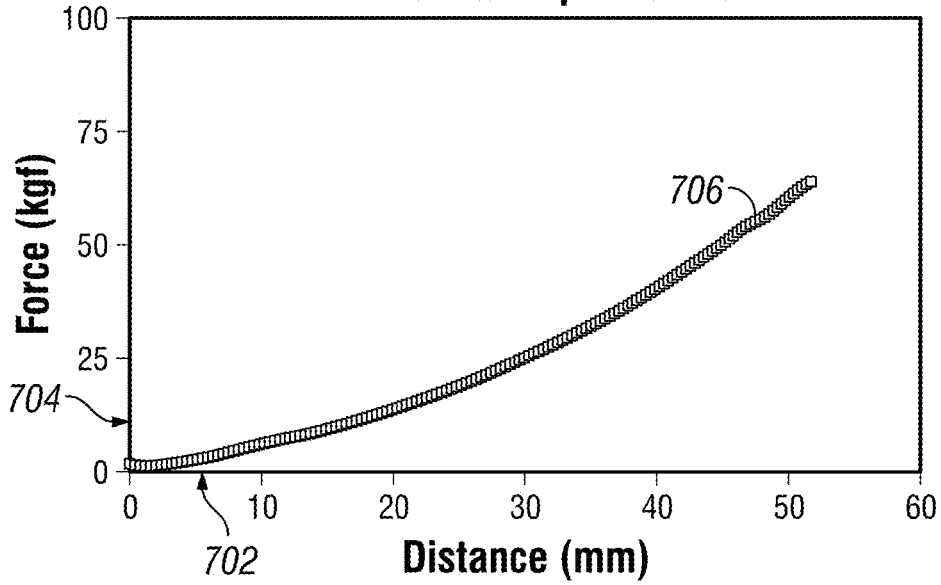
FIGS. 7A and 7B depict the results of a load measurement test for a commercially available LCM slurry composition without the addition of a date tree spikelet-based LCM in accordance with an embodiment of the disclosure.
Figure 7B:
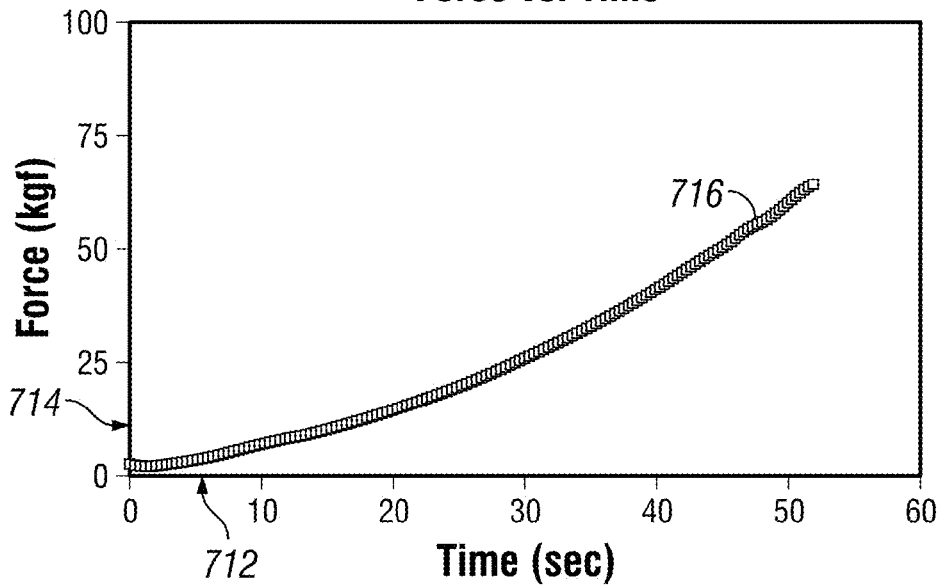

FIGS. 7A and 7B depict the results of the load measurement test for the commercially available LCM slurry composition without the addition of the date tree spikelet-based LCM. FIG. 7A is a plot 700 of force (in kgf and shown on the x-axis 702) vs. distance (in mm and shown on the y-axis 704) that depicts load-displacement behavior (i.e., load-displacement curve 706) of the commercially available LCM slurry composition. As shown in FIG. 7A, the slope of the initial linear portion of the load-displacement curve 706 indicates a low value of stiffness modulus and, thus, poor resistance to external forces and overbalance pressures. The load-displacement curve 706 shown in FIG. 7A further indicates a significant displacement of the commercially available LCM slurry composition until the plug resistance exceeds the maximum measurable load that can be registered by the load frame testing apparatus. Thus, when used in a drilling or cementing operation to prevent lost circulation, the commercially available LCM slurry composition may move a large distance within the loss zone before generating adequate resistance to stop the flow of the LCM slurry composition.

FIG. 7B is a plot 710 of force (in kgf and shown on the x-axis 712) vs. time (in seconds and shown on the y-axis 714) that depicts axial load-time (i.e., axial load-time curve 716) of the commercially available LCM slurry composition. As shown in FIG. 7B, the axial load-time curve 716 indicates a longer flow time for the commercially available LCM slurry composition to reach the test cell capacity. The axial load-time curve 716 further illustrates that when used in a drilling or cementing operation to prevent lost circulation the commercially available LCM slurry composition may flow for a longer time within the loss zone before generating adequate resistance to stop the flow of the LCM slurry composition.

Figure 8A:
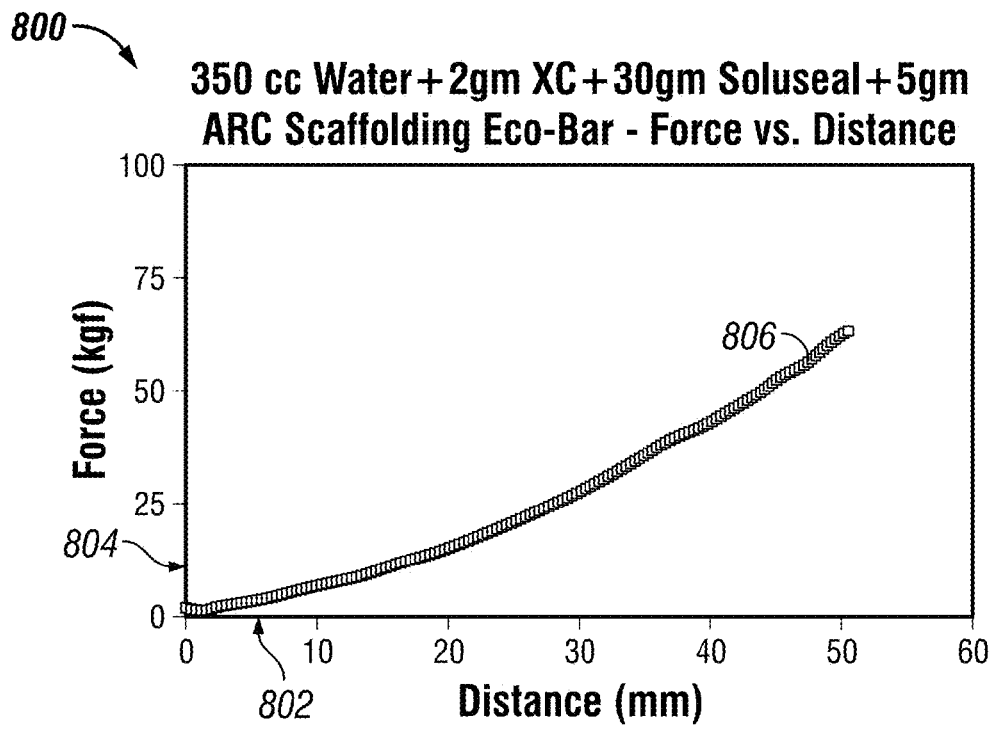
FIGS. 8A and 8B depict the results of a load measurement test for a commercially available LCM slurry composition having 5 grams of date tree spikelet-based LCM chips LCM in accordance with an embodiment of the disclosure.
Figure 8B:
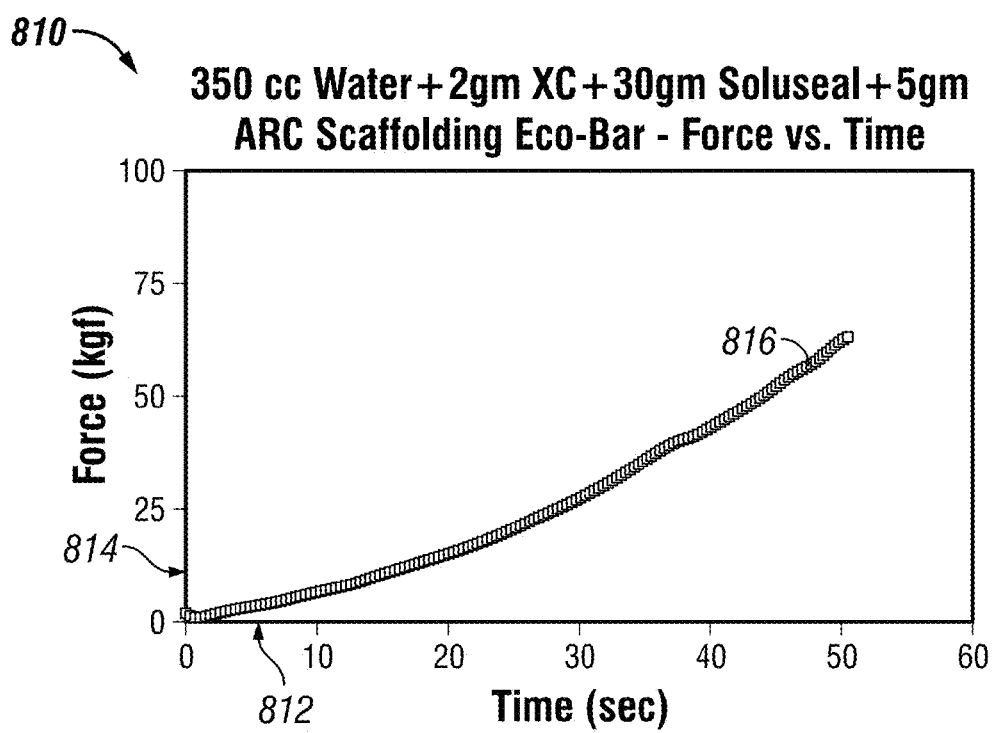

FIGS. 8A and 8B depict the results of the load measurement test for the commercially available LCM slurry composition having 5 grams of the date tree spikelet-based LCM. FIG. 8A is a plot 800 of force (in kgf and shown on the x-axis 802) vs. distance (in mm and shown on the y-axis 804) that depicts load-displacement behavior (i.e., load-displacement curve 806) of the first date tree spikelet-based LCM slurry composition having 5 grams of date tree spikelet-based LCM. As shown in FIG. 8A, the slope of the initial linear portion of the load-displacement curve 806 indicates a slight improvement of the stiffness modulus as compared to the stiffness moduli of the commercially available LCM slurry composition without the date tree spikelet-based LCM chips. Consequently, a minimum threshold amount of date tree spikelet-based LCM chips may be added to improve the stiffness and load-bearing capacity of the plugs and seals formed by an LCM composition.

FIG. 8B is a plot 810 of force (in kgf and shown on the x-axis 812) vs. time (in seconds and shown on the y-axis 814) that depicts axial load-time (i.e., axial load-time curve 816) of the commercially available LCM slurry composition having 5 grams of the date tree spikelet-based LCM. As shown in FIG. 8B, the axial load-time curve 816 indicates a slight improvement in flow time as compared to the commercially available LCM slurry composition without the date tree spikelet-based LCM chips. The axial load-time curve 716 further illustrates that when used in a drilling or cementing operation to prevent lost circulation, the commercially available LCM slurry composition may flow for a longer time within the loss zone before generating adequate resistance to stop the flow of the LCM slurry composition. Thus, the addition of 5 grams of the date tree spikelet-based LCM chips to the commercially available LCM slurry composition indicates that a minimum threshold amount of date tree spikelet-based LCM chips may be added to improve the stiffness and load-bearing capacity of the plugs and seals formed by an LCM composition.

Figure 9A:
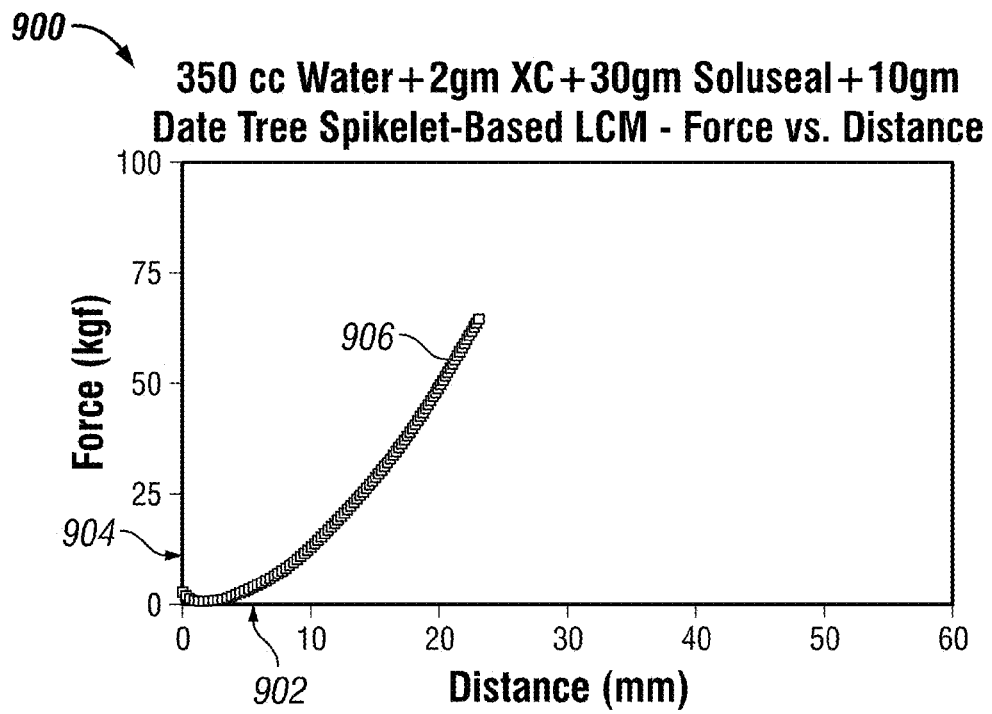
FIGS. 9A and 9B depict the results of the load measurement test for the commercially available LCM slurry composition having 10 grams of the date tree spikelet-based LCM chips in accordance with an embodiment of the disclosure.
Figure 9B:
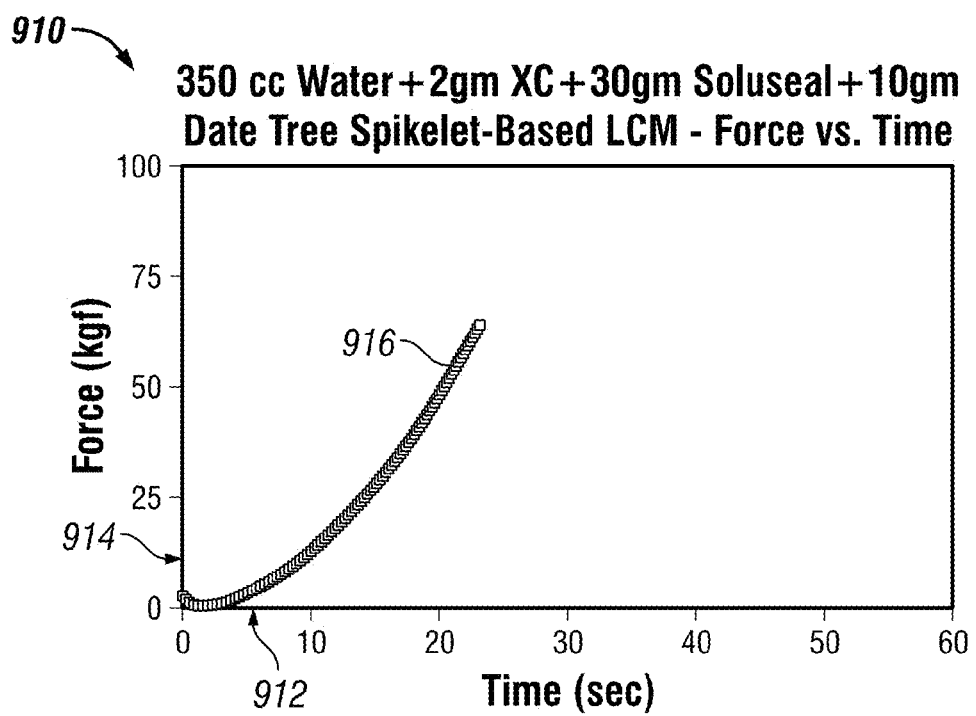

FIGS. 9A and 9B depict the results of the load measurement test for the commercially available LCM slurry composition having 10 grams of the date tree spikelet-based LCM chips. FIG. 9A is a plot 900 of force (in kgf and shown on the x-axis 902) vs. distance (in mm and shown on the y-axis 904) that depicts load-displacement behavior (i.e., load-displacement curve 906) of the second date tree spikelet-based LCM slurry composition having 10 grams of date tree spikelet-based LCM. As illustrated in FIG. 9A, the slope of the initial linear portion of the load-displacement curve 906 indicates a significant improvement in the stiffness modulus as compared to the stiffness moduli of the commercially available LCM slurry composition without the date tree spikelet-based LCM chips and the first date tree spikelet-based LCM slurry composition having 5 grams of date tree spikelet-based LCM. Additionally, the steeper rise of the non-linear portion of the load-displacement curve 906 also indicates an improvement in load bearing capacity of the formed plug as compared to the stiffness moduli of the commercially available LCM slurry composition without the date tree spikelet-based LCM and the LCM slurry composition having 5 grams of date tree spikelet-based LCM. Thus, at a minimum threshold amount of date tree spikelet-based LCM chips, the addition the date tree spikelet-based LCM may improve the stiffness and load-bearing capacity of the plugs and seals formed by the resulting LCM composition.

FIG. 9B is a plot 910 of force (in kgf and shown on the x-axis 912) vs. time (in seconds and shown on the y-axis 914) that depicts axial load-time (i.e., axial load-time curve 916) of the commercially available LCM slurry composition having 10 grams of the date tree spikelet-based LCM chips. As shown in FIG. 9B, the axial load-time curve 916 indicates a significant improvement in flow time as compared to the commercially available LCM slurry composition without the date tree spikelet-based LCM chips and the LCM slurry composition having 5 grams of date tree spikelet-based LCM. The axial load-time curve 716 illustrates that when used in a drilling or cementing operation to prevent lost circulation, the addition of the date tree spikelet-based LCM to an LCM may reduce flow time to generate resistance and stop fluid loss. Thus, the addition of 10 grams of the date tree spikelet-based LCM to the commercially available LCM slurry composition shows a minimum threshold amount of that may be added to improve the stiffness and load-bearing capacity of the plugs and seals formed by the resulting LCM composition. For example, axial load-time curve 916 shows a significant reduction in axial displacement and flow time for the commercially available LCM slurry composition having 10 grams of the date tree spikelet-based LCM chips as compared to the commercially available LCM slurry composition without the date tree spikelet-based LCM chips and the LCM slurry composition having 5 grams of date tree spikelet-based LCM. The reduction in axial displacement and flow time indicates a relatively fast generation of adequate resistance to flow and displacement. In such instances, the use of a minimum threshold amount of date tree spikelet-based LCM may enable a lower LCM pill or slurry volume during LCM treatment operations.

Table 1 depicts a comparison of the correlation coefficients and stiffness moduli determined for the respective load-displacement curves of FIGS. 7A, 8A, and 9A for the commercially available LCM slurry composition, the commercially available LCM slurry composition having 5 grams of the date tree spikelet-based LCM, and the commercially available LCM slurry composition having 10 grams of the date tree spikelet-based LCM chips:

TABLE 1

Stiffness Moduli for Commercially Available LCM Slurry Composition with and without Date Tree Spikelet-based LCM

| LCM Slurry Composition | LCM Sample | Correlation Coefficient | Stiffness Modulus |
|---|---|---|---|
| 350 cc water<br>2 g XC<br>30 g SOLU-SEAL ™ | Base LCM slurry | 0.996 | 0.786 |
| 350 cc water<br>2 g XC<br>30 g SOLU-SEAL ™<br>5 g date tree spikelet-based LCM chips | Base LCM slurry +<br>5 g date tree spikelet-based LCM chips | 0.998 | 0.885 |
| 350 cc water<br>2 g XC<br>30 g SOLU-SEAL ™<br>10 g date tree spikelet-based LCM chips | Base LCM slurry +<br>10 g date tree spikelet-based LCM chips | 0.996 | 3.664 |

Table 2 depicts a comparison of the axial displacement (in mm) and time (in seconds) to reach maximum load as determined from the respective load-time curves of FIGS. 7B, 8B, and 9B for the commercially available LCM slurry composition, the commercially available LCM slurry composition having 5 grams of the date tree spikelet-based LCM, and the commercially available LCM slurry composition having 10 grams of the date tree spikelet-based LCM:

TABLE 2

Axial Displacement and Time to Reach Maximum Load for Commercially Available LCM Slurry Composition with and without Date Tree Spikelet-based LCM

| LCM Slurry Composition | LCM Sample | Axial Displacement to Reach Maximum Load (mm) | Time to Reach Maximum Load (sec) |
|---|---|---|---|
| 350 cc water 2 g XC 30 g SOLU-SEAL ™ | Base LCM slurry | 53 | 53 |
| 350 cc water 2 g XC 30 g SOLU-SEAL ™ 5 g date tree spikelet-based LCM chips | Base LCM slurry + 5 g date tree spikelet-based LCM chips | 51 | 51 |
| 350 cc water 2 g XC 30 g SOLU-SEAL ™ 10 g date tree spikelet-based LCM chips | Base LCM slurry + 10 g date tree spikelet-based LCM chips | 24 | 24 |

As shown in Table 1, at a concentration of 10 g the date tree spikelet-based LCM significantly increased the stiffness modulus of the LCM composition, as compared to both the LCM slurry composition without the date tree spikelet-based LCM and the LCM slurry composition with 5 g of the date tree spikelet-based LCM. As shown in Table 2, at a concentration of 10 g the date tree spikelet-based LCM significantly reduced the axial displacement to reach maximum load and the time to reach maximum load of the LCM composition, as compared to both the LCM composition without the date tree spikelet-based LCM and the LCM slurry composition with 5 g of the date tree spikelet-based LCM.

Accordingly, as shown in Tables 1-2, the date tree spikelet-based LCM demonstrated the potential reinforcement of the physio-mechanical properties of seals and plugs formed by a conventional LCM and, consequently, the improvement of the rigidity and load bearing capacity of such seals and plugs. The date tree spikelet-based LCM may be used to stabilize the seals and plugs formed by various LCM (for example, LCM pills and slurries) and improve the success rate of LCM treatments in both drilling and cementing operations. Moreover, in some embodiments, the concentration of date tree spikelet-based LCM added to an existing LCM may be increased to improve the rigidity and load bearing capacity of such seals and plugs, as shown by the increase in stiffness modulus and reduction in axial displacement and time to reach maximum load discussed above.

Date Tree Spikelet-Based LCM Manufacture and Use

In some embodiments, a date tree spikelet-based LCM may include chips formed from date tree spikelets. The date tree spikelets may be obtained from date tree panicles produced as a waste by-product from date processing. The date tree spikelets may be obtained from date processing plants to provide a sustainable source of material for the date tree spikelets LCM. Moreover, local sources of date tree spikelets may reduce the cost of imported LCM products, components, or both. In some embodiments, the date tree spikelets may be obtained from the species *phoenix dactylifera*. It should be appreciated that, in some embodiments, the date tree spikelets may be obtained from genetically modified date trees (that is, genetically modified organisms (GMOs)). In some embodiments, the date tree panicles obtained from date tree waste or the date tree spikelets separated from the date tree panicles may be prepared by cleaning the date tree waste before use as an LCM, such as by washing the date tree panicles.

In some embodiments, the date tree spikelet-based LCM may include chips having a length in the range of about 5 mm to about 10 mm with an equivalent diameter in the range of about 1 mm to about 2mm, and an aspect ratio range of about 2.5 to about 10. The date tree spikelet-based LCM may include chips capable of reinforcing and providing structural support to seals and plugs formed in moderate to severe loss zones having gaps and fractures of about 2 mm or greater.

In some embodiments, the date tree spikelet-based LCM may include chips formed from untreated date tree spikelets, thus preserving the environmentally-friendly and biodegradable properties of the manufacturing process, the chips, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree spikelet-based LCM may be manufactured without treating before, during, or after crushing, grinding, drying, or any other processing to produce chips formed from date tree spikelets.

In some embodiments, the date tree spikelet-based LCM may be added directly to a drilling fluid, such as a drilling mud, to create an altered drilling fluid having the date tree spikelet-based LCM. For example, in some embodiments, the date tree spikelet-based LCM may be added to (for example, blended with) an oil-based drilling mud or a water-based drilling mud. In some embodiments, the date tree spikelet-based LCM may be added at the mud pit of a mud system. In some embodiments, the concentration of date tree spikelet-based LCM in an altered drilling fluid may be in the range of about 5 parts-per-billion (ppb) to about 10 ppb.

In some embodiments, the date tree spikelet-based LCM may be used as an LCM additive with one or more additional LCMs. For example, date tree spikelet-based LCM and one or more additional LCMs may be added directly to a drilling fluid, such as a drilling mud, to create an altered drilling fluid having the date tree spikelet-based LCM and the one or more additional LCMs. In some embodiments, the date tree spikelet-based LCM and an additional LCM may have a weight ratio in the range of about 1:1 to about 1:6. For example, in some embodiments the date tree spikelet-based LCM to an additional LCM weight ratio may be about 1:1, about 1:2, about 1:3, or about 1:4.

After addition of the date tree spikelet-based LCM to a drilling fluid, either alone or with one or more additional LCMs, the altered drilling fluid may be circulated at a pump rate effective to position the altered drilling fluid into contact with a lost circulation zone in a wellbore, such that the chips of the date tree spikelet-based LCM alter the lost circulation zone (for example, by entering and blocking porous and permeable paths, cracks, and fractures in a formation in the lost circulation zone, such as forming or reinforcing a structure in a mouth or within a fracture). In some embodiments, the date tree spikelet-based LCM may be introduced to a lost circulation zone after introduction of another LCM.

In such embodiments, the date tree spikelet-based LCM may be introduced to reinforce seals and plugs from by another LCM.

As noted in the disclosure, the eco-friendly, non-toxic, and environmentally friendly properties of the date tree spikelet-based LCM may minimize or prevent any environmental impact, any effect on ecosystems, habitats, population, crops, and plants surrounding the drilling site where the date tree spikelet-based LCM is used.

Figure 10:
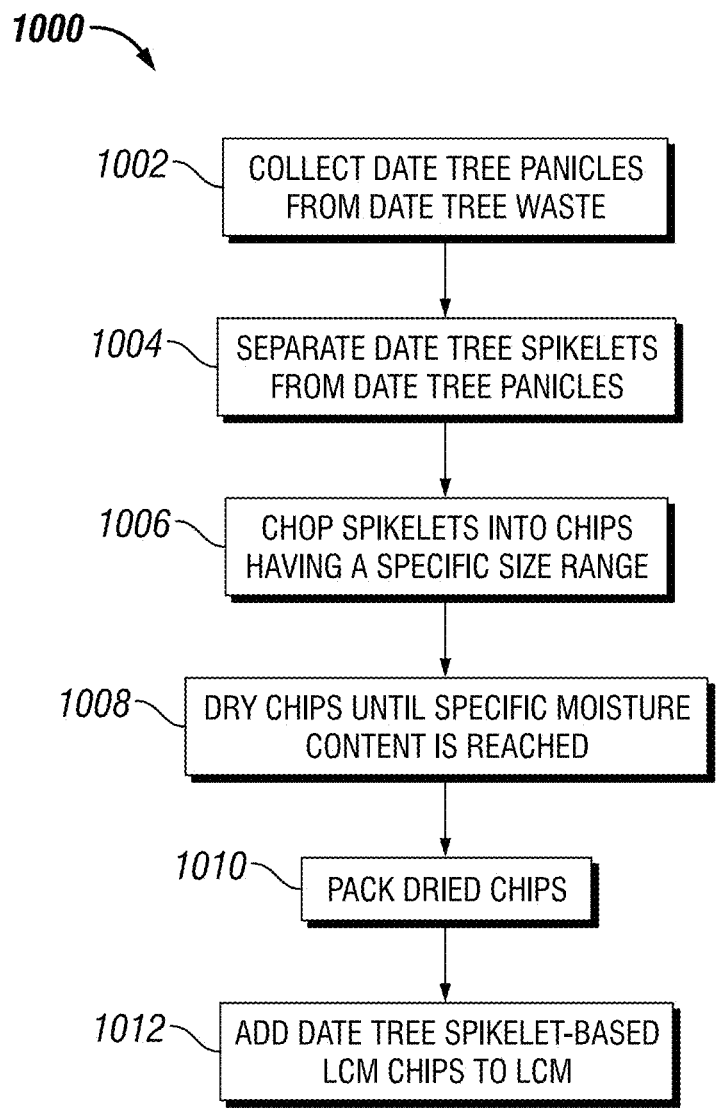
FIG. 10 is a flowchart of a process for producing and using a date tree spikelet-based LCM in accordance with an example embodiment of the disclosure.

FIG. 10 depicts a process 1000 for producing and using a date tree spikelet-based LCM in accordance with an example embodiment of the disclosure. Initially, date tree panicles may be collected from date tree waste (block 1002), such as from a date processing facility. In some embodiments, date tree panicles may be collected from a date processing facility and transported to another facility for processing as described in the disclosure. Next, date tree spikelets may be separated from the date tree panicles (block 1004). In some embodiments, the separation of the date tree spikelets may be performed manually. In some embodiments, the separation of the date tree spikelets may be performed automatically using a commercial scratching tool having a suitable speed regulation and tooth spacing for the separation. In some embodiments, the date tree spikelets may be cleaned, such as by blowing air over the spikelets to remove dust, dirt, and other materials.

The date tree spikelets may then be chopped into chips having a specific size range (block 1006). For example, in some embodiments, the date tree spikelets may be chopped into chips having a length in the range of about 5 mm to about 10 mm. In some embodiments, the date tree trunks may be chopped manually using a suitable chopping tool. In other embodiments, the date tree trunks may be chopped automatically via a suitable machine, such as a commercial chopping machine. In such embodiments, for example, the chopping machine may include an adjustable chopping blade that enables the formation of chips of various size ranges. Further in such embodiments, a collection tank may be placed below the chopper to collect the chips formed from the chopped date tree spikelets.

The chips may then be dried until a specific moisture content is reached (block 1008). In some embodiments, the chips may be dried in the sun at atmospheric conditions and for a time period to reach the specific moisture content. In some embodiments, for example, the chips may be dried until the moisture content is less than about 6%. The chips may then be packed (block 1010) for storage, transportation, and use. For example, the chips may be packed in water proof bags for use as an LCM and stored in a dry environment to prevent damage and degradation of the date tree spikelet-based LCM. In some embodiments, for example, a suitable amount of chips may be transported to an oil and gas operations site for use as an LCM.

In some embodiments, the date tree spikelet-based LCM may be added to an additional LCM as an LCM additive (block 1012). For example, in some embodiments the date tree spikelet-based LCM may be added to a commercially available LCM (for example, a fiber or flake LCM) or LCM blend. In some embodiments, the date tree spikelet-based LCM and the additional LCM may be added directly to a drilling fluid (block 1014), such as a drilling mud, to create an altered drilling fluid having the LCM. For example, in some embodiments, the LCMs may be added to (for example, blended with) an oil-based drilling mud or a water-based drilling mud. In some embodiments, the date tree spikelet-based LCM and additional LCM may be added at the mud pit of a mud system. After addition of the date tree spikelet-based LCM, the altered drilling fluid may be circulated at a pump rate effective to position the drilling fluid into contact with a lost circulation zone in a wellbore, such that the chips of the date tree spikelet-based LCM alters the lost circulation zone (for example, by entering and blocking porous and permeable paths, cracks, and fractures in a formation in the lost circulation zone). In other embodiments, the date tree spikelet-based LCM may be added to a cement slurry for use in a cementing operation. For example, the date tree spikelet-based LCM may be added to an additional LCM as an additive, and both LCMs may be added to a cement slurry.

In other embodiments, the date tree spikelet-based LCM may be used alone as an LCM and added to a drilling fluid, such as a drilling mud, to create an altered drilling fluid having the LCMs. For example, in some embodiments, the date tree spikelet-based LCM may be added to oil-based drilling mud or a water-based drilling mud, such as at the mud pit of a mud system. As described above, the altered drilling fluid may be circulated at a pump rate effective to position the drilling fluid into contact with a lost circulation zone in a wellbore, such that the chips of the date tree spikelet-based LCM alters the lost circulation zone (for example, by entering and blocking porous and permeable paths, cracks, and fractures in a formation in the lost circulation zone).

The biodegradation properties of the date tree spikelet-based LCM may enable the chips of the date tree spikelet-based LCM to easily degrade and disappear from the environment over time and minimize or prevent any environmental impact. Further, the non-toxic properties of the da date tree spikelet-based LCM may minimize or prevent any effect on ecosystems, habitats, population, crops, and plants surrounding the drilling site where the date tree spikelet-based LCM is used.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method to control lost circulation in a lost circulation zone in a wellbore, comprising introducing an altered drilling fluid into the wellbore such that the altered drilling fluid contacts the lost circulation zone and reduces a rate of lost circulation into the lost circulation zone, where the altered drilling fluid comprises a drilling fluid and a lost circulation material (LCM), wherein the LCM consists of a plurality of chips formed from a plurality of date tree spikelets.

2. The method of claim 1, wherein the plurality of date tree spikelets comprise a plurality of untreated date tree spikelets.

3. The method of claim 1, wherein the LCM is a first LCM and the altered drilling fluid comprises the drilling fluid, the first LCM, and a second LCM.

4. The method of claim 3, wherein the first LCM and the second LCM have a weight ratio of 1:3.

5. The method of claim 3, wherein the first LCM comprising the plurality of chips formed from date tree spikelets was added to the second LCM as an LCM additive.

6. The method of claim 1, wherein each of the plurality of chips has a length in the range of 5 millimeters (mm) to 10 mm.

7. The method of claim 1, wherein each of the plurality of chips has an equivalent diameter in the range of 1 millimeters (mm) to 2 mm.

8. The method of claim 1, wherein each of the plurality of chips has an aspect ratio in the range of 2.5 to 10.

9. An altered drilling fluid, comprising:
 a drilling fluid; and
 a lost circulation material (LCM), wherein the LCM consists of a plurality of chips formed from a plurality of date tree spikelets.

10. The altered drilling fluid of claim 9, wherein the plurality of date tree spikelets comprises a plurality of untreated date tree spikelets, wherein the plurality of untreated date tree spikelets are not introduced to an alkali, an acid, a bleaching or an oxidation agent before forming the LCM.

11. The altered drilling fluid of claim 9, wherein the LCM is a first LCM and the altered drilling fluid comprises the drilling fluid, the first LCM, and a second LCM.

12. The altered drilling fluid of claim 11, wherein the first LCM and the second LCM have a weight ratio of 1:3.

13. The altered drilling fluid of claim 9, wherein each of the plurality of chips has a length in the range of 5 millimeters (mm) to 10 mm.

14. The altered drilling fluid of claim 9, wherein each of the plurality of chips has an equivalent diameter in the range of 1 millimeters (mm) to 2 mm.

15. The altered drilling fluid of claim 9, wherein each of the plurality of chips has an aspect ratio in the range of 2.5 to 10.

16. A method of forming a lost circulation material (LCM), comprising:
 separating a plurality of date tree spikelets from a plurality of date tree panicles;
 chopping the plurality of date tree spikelets to form a plurality of chips having a length in the range of 5 millimeters (mm) to 10 mm to form a lost circulation material (LCM) comprising the plurality of chips.

17. The method of claim 16, comprising drying the plurality of chips for a time period after chopping the plurality of date tree spikelets, wherein the drying reduces the moisture content of the plurality of chips to less than 6%.

18. The method of claim 16, wherein each of the plurality of chips has an equivalent diameter in the range of 1 millimeters (mm) to 2 mm.

19. The method of claim 16, wherein each of the plurality of chips has an aspect ratio in the range of 2.5 to 10.

20. The method of claim 16, wherein the plurality of chips comprises a plurality of untreated chips, wherein the plurality of untreated chips are not introduced to an alkali, an acid, a bleaching or an oxidation agent before forming the LCM.

\* \* \* \* \*